(12) United States Patent
Jia (10) Patent No.: US 11,199,925 B2
(45) Date of Patent: Dec. 14, 2021

(54) TOUCH DISPLAY MODULE AND ELECTRONIC DEVICE

(71) Applicant: GUANGDONG OPPO MOBILE TELECOMMUNICATIONS CORP., LTD., Guangdong (CN)

(72) Inventor: Yuhu Jia, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/074,196

(22) Filed: Oct. 19, 2020

(65) Prior Publication Data

US 2021/0034191 A1 Feb. 4, 2021

Related U.S. Application Data

(63) Continuation of application No. PCT/CN2019/089377, filed on May 30, 2019.

(30) Foreign Application Priority Data

Jun. 11, 2018 (CN) .......................... 201810597852.1
Jun. 11, 2018 (CN) .......................... 201820900747.6

(51) Int. Cl.
*G06F 3/041* (2006.01)
*G02F 1/1333* (2006.01)
(Continued)

(52) U.S. Cl.
CPC ........ *G06F 3/0416* (2013.01); *G02F 1/13338* (2013.01); *G02F 1/13452* (2013.01);
(Continued)

(58) Field of Classification Search
None
See application file for complete search history.

(56) References Cited

U.S. PATENT DOCUMENTS

2014/0347284 A1* 11/2014 Lee .................. G06F 3/0412
345/173
2016/0041642 A1 2/2016 Cheng et al.
(Continued)

FOREIGN PATENT DOCUMENTS

CN 107357096 11/2017
CN 107704121 2/2018
(Continued)

OTHER PUBLICATIONS

WIPO, ISR for PCT/CN2019/089377, Aug. 15, 2019.
(Continued)

*Primary Examiner* — Christopher R Lamb
(74) *Attorney, Agent, or Firm* — Hodgson Russ LLP (57) ABSTRACT

A touch display module and an electronic device are provided. The touch display module includes a touch display panel. The touch display panel is provided with a first pixel area including a first pixel and a second pixel area including a second pixel, where a resistor-capacitance (RC) load of the first pixel is not equal to an RC load of the second pixel. The first pixel area is provided with a first electrode corresponding to the first pixel. The second pixel area is provided with a second electrode corresponding to the second pixel. The second electrode is spaced apart from the first electrode. When the touch display panel is operating in a display mode, the first electrode is electrically coupled with the second electrode, where the first electrode and the second electrode are common electrodes.

20 Claims, 9 Drawing Sheets

(51) Int. Cl.
*G02F 1/1343* (2006.01)
*G02F 1/1345* (2006.01)
*G09G 3/36* (2006.01)

(52) U.S. Cl.
CPC .. *G02F 1/133345* (2013.01); *G02F 1/134309* (2013.01); *G06F 3/0412* (2013.01); *G09G 3/3648* (2013.01); *G02F 2201/121* (2013.01); *G02F 2201/123* (2013.01); *G09G 2310/08* (2013.01); *G09G 2320/0233* (2013.01)

(56) References Cited

U.S. PATENT DOCUMENTS

| | | | |
|---|---|---|---|
| 2017/0301280 A1* | 10/2017 | Ka | G09G 3/3406 |
| 2018/0158417 A1* | 6/2018 | Xiang | G09G 3/3233 |
| 2019/0073976 A1* | 3/2019 | Yeh | G02F 1/136286 |
| 2019/0243498 A1 | 8/2019 | Wang et al. | |

FOREIGN PATENT DOCUMENTS

| | | |
|---|---|---|
| CN | 107797705 | 3/2018 |
| CN | 107831937 | 3/2018 |
| CN | 207115380 | 3/2018 |
| KR | 20150000184 | 1/2015 |
| WO | 2018058647 | 4/2018 |

OTHER PUBLICATIONS

EPO, Extended European Search Report for EP Application No. 19819652.9, dated Apr. 1, 2021.
IPI, Office Action for IN Application No. 202017038889, dated May 24, 2021.

\* cited by examiner

TOUCH DISPLAY MODULE AND ELECTRONIC DEVICE

CROSS-REFERENCE TO RELATED APPLICATION(S)

This application is a continuation of International Application No. PCT/CN2019/089377, filed on May 30, 2019, which claims priority to Chinese Patent Application No. 201810597852.1, filed on Jun. 11, 2018, and Chinese Patent Application No. 201820900747.6, filed on Jun. 11, 2018, the entire disclosures of which are hereby incorporated by reference.

TECHNICAL FIELD

This disclosure relates to the field of electronic equipment, and particularly to a touch display module and an electronic device.

BACKGROUND

An electronic device such as a mobile phone usually includes a backlight module and a display screen. The backlight module is generally used to provide light for the display screen. The display screen usually includes a common electrode and a pixel electrode. The common electrode and the pixel electrode cooperate with each other to achieve flipping of liquid crystal molecules in the display screen. After lights emitted from the backlight module enter into the display screen, there will be different transmittances due to different flip angles of the liquid crystal molecules. When there is more light passing through a pixel area of the display screen, brightness of the pixel area is relatively bright. When there is few light passing through a pixel area of the display screen, the brightness of the pixel area is relatively dark. In this way, the display screen presents an image. However, if the display screen is integrated with a touch function, if both a display function and the touch function are taken into consideration, brightness of the display screen may be uneven due to various reasons when the display screen displays an image, which resulting in reduced display quality in display of the display screen.

SUMMARY

According to the disclosure, a touch display module is provided. The touch display module includes a touch display panel. The touch display panel is provided with a first pixel area including a first pixel and a second pixel area including a second pixel, where a resistor-capacitance (RC) load of the first pixel is not equal to an RC load of the second pixel. The first pixel area is provided with a first electrode corresponding to the first pixel, the second pixel area is provided with a second electrode corresponding to the second pixel, where the first electrode is spaced apart from the second electrode. The first electrode is electrically coupled with the second electrode when the touch display panel is operating in a display mode, where the first electrode and the second electrode are common electrodes.

According to the disclosure, a touch display module is provided. The touch display module includes a touch display panel. The touch display panel is provided with a first pixel area including a first pixel and a second pixel area including a second pixel, where an RC load of the first pixel is not equal to RC load of the second pixel. The first pixel area and the second pixel area are loaded with a same driving voltage when the touch display panel is operating in a display mode, so that brightness of the first pixel area is the same as that of the second pixel area.

According to the disclosure, an electronic device is provided. The electronic device includes the foregoing touch display module.

BRIEF DESCRIPTION OF THE DRAWINGS

In order to describe technical solutions of implementations of the disclosure more clearly, the following will give a brief description of accompanying drawings used for describing the implementations. Apparently, accompanying drawings described below are merely some implementations. Those of ordinary skill in the art can also obtain other accompanying drawings based on the accompanying drawings described below without creative efforts.

DETAILED DESCRIPTION

In a first aspect of the disclosure, a touch display module is provided. The touch display module includes a touch display panel. The touch display panel is provided with a first pixel area including a first pixel and a second pixel area including a second pixel. A resistor-capacitance (RC) load of the first pixel is not equal to an RC load of the second pixel. The first pixel area is provided with a first electrode corresponding to the first pixel. The second pixel area is provided with a second electrode corresponding to the second pixel. The first electrode is spaced apart from the second electrode. When the touch display panel is operating in a display mode, the first electrode is electrically coupled with the second electrode, where the first electrode and the second electrode are common electrodes.

In a first implementation according to the first aspect, when the touch display panel is operating in a touch mode, the first electrode is electrically insulated from the second electrode.

In a second implementation according to the first implementation, the touch display module further includes a first switch, a second switch, a first transmission line, and a second transmission line. When the touch display panel is operating in the display mode, the first electrode is electrically coupled with the second electrode via the first switch, the second switch, the first transmission line, and the second transmission line.

In a third implementation according to the second implementation, the first switch includes a first control end, a first connection end, and a second connection end. The first control end is electrically coupled with the first transmission line. The first connection end is electrically coupled with the second transmission line. The second connection end is electrically coupled with the first electrode. The second switch includes a second control end, a third connection end, and a fourth connection end. The second control end is electrically coupled with the first transmission line. The third connection end is electrically coupled with the second transmission line. The fourth connection end is electrically coupled with the second electrode. The first transmission line is configured to be loaded with a first control signal suitable for controlling the first switch and the second switch to switch on when the touch display panel is operating in the display mode, the second transmission line is configured to be loaded with a second control signal, where the second control signal is a common voltage signal.

In a fourth implementation according to the third implementation, when the touch display panel is operating in the touch mode, the first control signal is suitable for controlling the first switch and the second switch to switch off.

In a fifth implementation, the touch display panel includes a first substrate. The first substrate is provided with common electrodes. The common electrodes include a plurality of first electrodes spaced apart from one another and a plurality of second electrodes spaced apart from one another.

In a sixth implementation according to the fifth implementation, the first substrate is further provided with pixel electrodes. The pixel electrodes are insulated from the common electrodes.

In a seventh implementation according to the sixth implementation, the touch display panel further includes a second substrate and a liquid crystal layer. The second substrate is spaced apart from the first substrate. The second substrate is provided with a light-filtering unit. The liquid crystal layer is disposed between the first substrate and the second substrate.

In an eighth implementation according to the second implementation, the touch display panel includes a non-display area which is non-transparent. The first switch, the second switch, the first transmission line, and the second transmission line are all disposed in the non-display area.

In a ninth implementation according to the eighth implementation, the first transmission line and the second transmission line are at least partially stacked. An insulating layer is provided between the first transmission line and the second transmission line.

In a tenth implementation according to the eighth implementation, the touch display panel further includes a display area. The display area is disposed adjacent to the non-display area and includes a display body area, a first display extension area, and a second display extension area. The first display extension area and the second display extension area are extended from a same side of the display body area. The first display extension area is spaced apart from the second display extension area. The non-display area includes a non-display body area and a non-display extension area which is extended from the non-display body area towards the display area. The non-display extension area is sandwiched between the first display extension area and the second display extension area.

In an eleventh implementation according to the tenth implementation, the first pixel area is located in the display area adjacent to the non-display area. An area of the first pixel area is smaller than an area of the second pixel area.

In a twelfth implementation according to the first implementation, a time period for the touch display panel to display a frame of an image includes a first time period and a second time period successively. The touch display panel is operating in the display mode during the first time period. The touch display panel is operating in the touch mode during the second time period.

In a thirteenth implementation according to the twelfth implementation, the time period for the touch display panel to display a frame of an image further includes a buffer time period before the first time period. When the display panel is in the buffer time period, the touch display panel is configured to release remained power for displaying a previous frame of an image.

In a fourteenth implementation according to the third implementation or the fourth implementation, the touch display module further includes a driving chip and a flexible circuit board. The driving chip is configured to generate the second control signal. The driving chip includes a dummy pin. The dummy pin is electrically coupled with the flexible circuit board and electrically coupled with the second transmission line via the flexible circuit board to transmit the second control signal to the second transmission line.

In a second aspect of the disclosure, a touch display module is provided. The touch display module includes a touch display panel. The touch display panel is provided with a first pixel area including a first pixel and a second pixel area including a second pixel, where an RC load of the first pixel is not equal to an RC load of the second pixel. When the touch display panel is operating in a display mode, the first pixel area and the second pixel area are loaded with a same driving voltage, so that brightness of the first pixel area is the same as that of the second pixel area.

In a first implementation, when the touch display panel is operating in a touch mode, the touch display panel is configured to detect a touch signal of the touch display panel. A time period for the touch display panel to display a frame of an image includes a first time period and a second time period successively. The touch display panel is operating in the display mode during the first time period. The touch display panel is operating in the touch mode during the second time period.

In a second implementation according to the first implementation, the time period for the touch display panel to display a frame of an image further includes a buffer time period before the first time period. When the touch display panel is in the buffer time period, the touch display panel is configured to release remained power for displaying a previous frame of an image.

In a second implementation according to the first implementation, the first pixel area is provided with a first electrode corresponding to the first pixel. The second pixel area is provided with a second electrode corresponding to the second pixel. The first electrode is spaced apart from the second electrode. When the touch display panel is operating in the touch mode, the first electrode is electrically insulated from the second electrode.

In a third aspect of the disclosure, an electronic device is provided. The electronic device includes the touch display module according to the first aspect, any of the implementations of the first aspect, the second aspect, and any of the implementations of the second aspect.

Hereinafter, technical solutions embodied by the implementations of the disclosure will be described in a clear and comprehensive manner with reference to the accompanying drawings intended for the implementations. It is evident that the implementations described herein constitute merely some rather than all of the implementations of the disclosure, and that those of ordinary skill in the art will be able to derive other implementations based on these implementations without making creative efforts, which all such derived implementations shall all fall in the protection scope of the disclosure.

Figure 1:
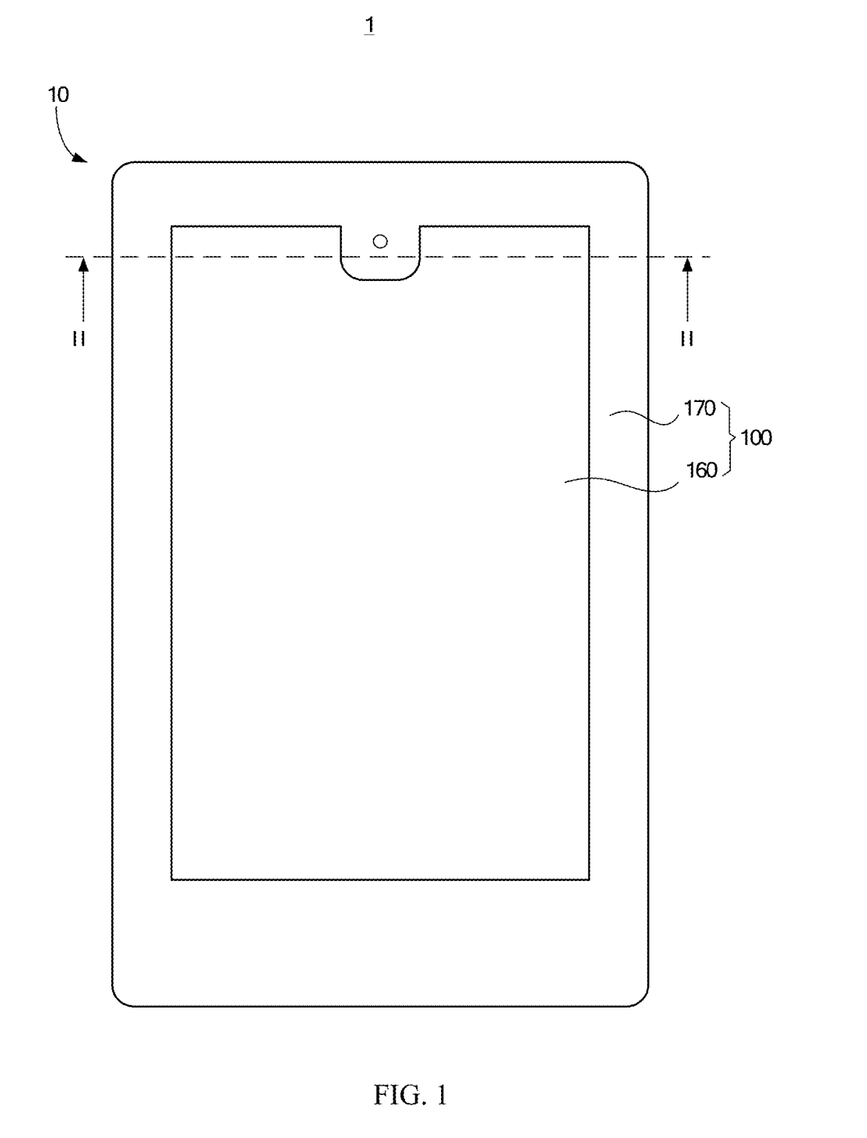
FIG. 1 is a schematic structural diagram illustrating an electronic device according to a first implementation.
Figure 2:
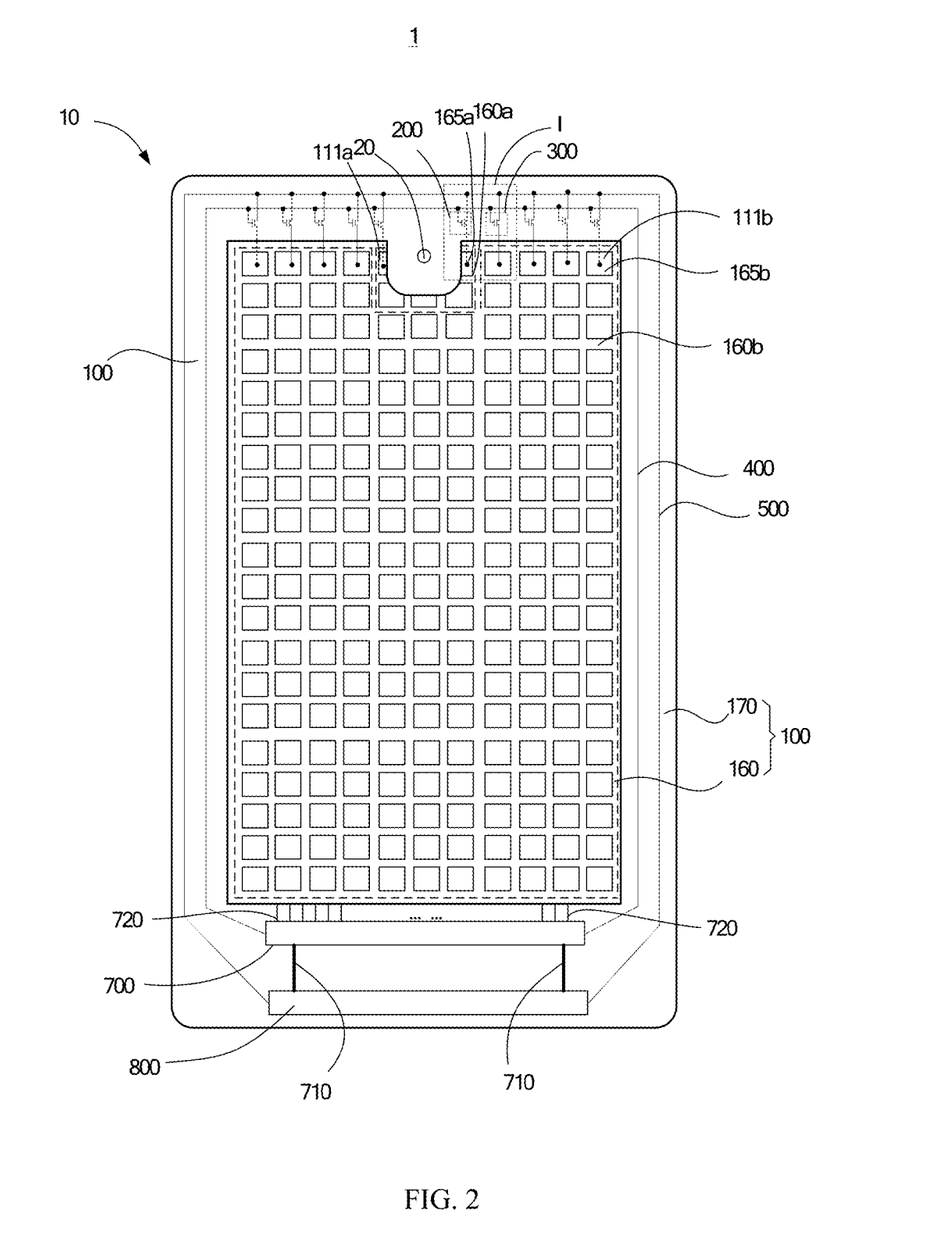
FIG. 2 is a schematic structural diagram illustrating a touch display module according to a first implementation.

Referring to FIG. 1 and FIG. 2, FIG. 1 is a schematic structural diagram illustrating an electronic device according to a first implementation, and FIG. 2 is a schematic structural diagram illustrating a touch display module according to the first implementation. The electronic device includes, but is not limited to, a smart phone, a mobile internet device (MID), an e-book, a play station portable (PSP), a personal digital assistant (PDA), and other devices.

As illustrated in FIG. 1 and FIG. 2, an electronic device 1 includes a touch display module 10. The touch display module 10 has a display function and a touch function. The touch display module 10 includes a touch display panel 100. The touch display panel 100 includes a first pixel area 160a and a second pixel area 160b. The first pixel area 160a includes a first pixel(s) 165a. An RC load of the first pixel 165a is a first load. The second pixel area 160b includes a second pixel(s) 165b. An RC load of the second pixel 165b is a second load. The first load is not equal to the second load. The first pixel area 160a is provided with a first electrode 111a corresponding to the first pixel 165a. The second pixel area 160b is provided with a second electrode 111b corresponding to the second pixel 165b. The first electrode 111a is spaced apart from the second electrode 111b a. The touch display panel 100 is operable with a display mode. When the touch display panel 100 is in the display mode, the first electrode 111a is electrically coupled with the second electrodes 111b, and the first electrode 111a and the second electrode 111b are common electrodes. The term "first" used in the "first pixel area 160a" of the disclosure and the term "second" used in the "second pixel area 160b" of the disclosure are for descriptive purposes only, and should not be understood as indicating or implying relative importance or the number of technical features indicated. Similarly, other descriptions of the disclosure related to "first" and "second" are for descriptive purposes only, and should not be understood as indicating or implying relative importance or the number of technical features indicated.

Further, the touch display panel 100 is further operable with a touch mode. When the touch display panel 100 is in the touch mode, the first electrode 111a is electrically insulated from the second electrode 111b. When the touch display panel 100 is in the display mode, the touch display panel 100 can display an image, text, a video, and the like. When the touch display panel 100 is in the touch mode, the touch display panel 100 can accept a touch operation instruction.

If the first electrode 111a is electrically insulated from the second electrode 111b, since a load value of a first load of the first pixel 165a is different from that of a second load of the second pixel 165b, a current flowing through the first pixel 165a is different from a current flowing through the second pixel 165b when a voltage applied to the first electrode 111a is the same as a voltage applied to the second electrode 111b, as such, brightness presented by the first pixel 165a is different from brightness presented by the second pixel 165b. That is, the touch display panel 100 may have uneven brightness when displaying an image, which reduces display quality of the touch display panel 100. According to the disclosure, when the touch display module 10 is in the display mode, the first electrode 111a, which is used as the common electrode, is electrically coupled with the second electrode 111b, which is also used as the common electrode. In this case, an RC loaded on the first pixel 165a is the same as an RC load loaded on the second pixel 165b. When a voltage applied to the first pixel 165a is the same as a voltage applied to the second pixel 165b, the current flowing through the first pixel 165a is the same as the current flowing through the second pixel 165b, as such, the brightness presented by the first pixel 165a is the same as the brightness presented by the second pixel 165b, thereby improving the display quality of the touch display panel 100.

Figure 5:
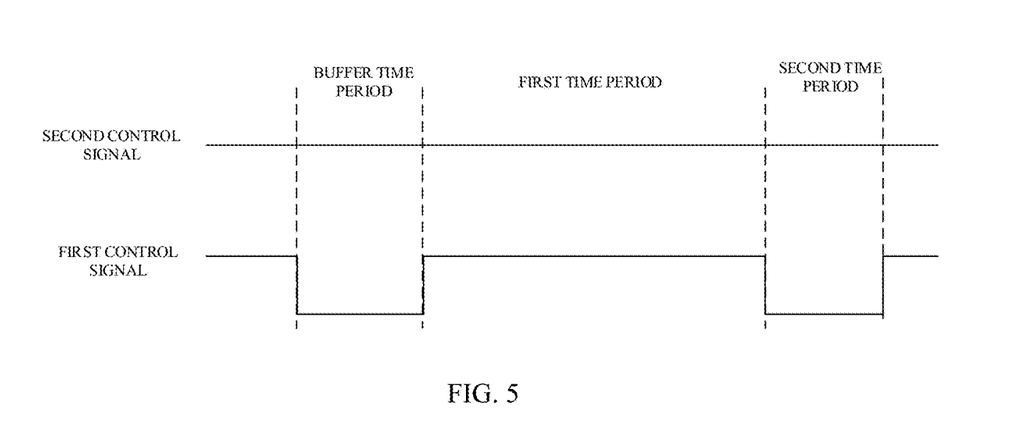
FIG. 5 is a timing diagram of a first control signal and a second control signal in a touch display panel at respective stages, when a first switch and a second switch in the touch display panel are N-type thin film transistors.
Figure 6:
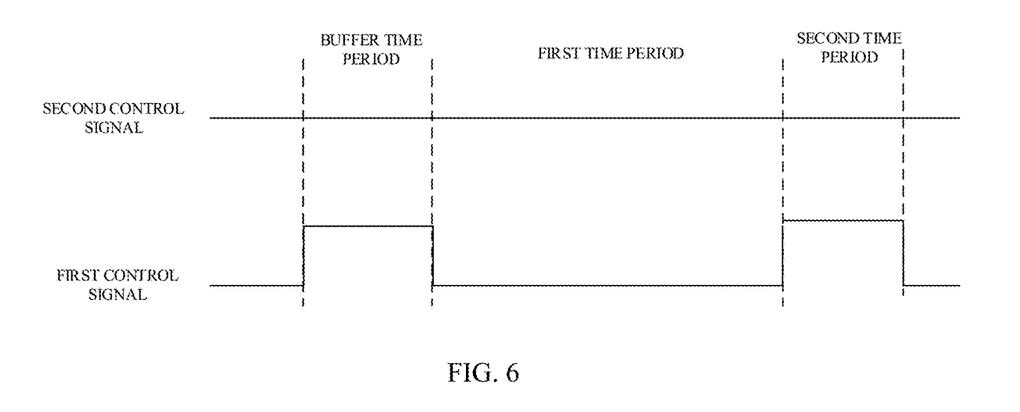
FIG. 6 is a timing diagram of a first control signal and a second control signal in a touch display panel at respective stages, when a first switch and a second switch in the touch display panel are P-type thin film transistors.

Referring to FIG. 5 or FIG. 6, when the touch display panel 100 displays a frame of an image, a time period for the touch display panel 100 to display the frame of the image includes a first time period and a second time period successively. The touch display panel 100 is in the display mode during the first time period. The touch display panel 100 is in the touch mode during the second time period. According to the disclosure, the time period for the touch display panel 100 to display a frame of an image includes the first time period and the second time period successively. Although the first time period during which the touch display panel 100 is in the display mode does not occupy the entire time period during which the touch display panel 100 displays a frame of an image, human eyes will not perceive the time interval when the touch display panel 100 displays a frame of an image due to visual residue of the human eyes, but will perceive that screen display continues for the first time period and the second time period.

Further, when the touch display panel 100 displays a frame of an image, the touch display module 10 is further in a buffer time period before the first time period. The buffer time period is configured to release remained power for displaying a previous frame of an image on the touch display panel 100. According to the disclosure, the buffer time period is set, and the buffer time period is before the first time period in which the touch display panel 100 is in the display mode. When the touch display panel 100 is in the buffer time period, the touch display panel 100 releases the remained power for displaying a previous frame of an image. In this way, the touch display panel 100 is not affected by the remained power for displaying the previous frame of the image when displaying a current frame of an image, which improves display quality of displaying the current frame of the image, and accordingly, display quality of the touch display panel 100 can be improved.

Further, the touch display module 10 further includes a first switch(es) 200, a second switch(es) 300, a first transmission line 400, and a second transmission line 500. When the touch display panel 100 is in the display mode, the first electrode 111a is electrically coupled with the second electrode 111b via the first switch 200, the second switch 300, the first transmission line 400, and the second transmission line 500.

Figure 3:
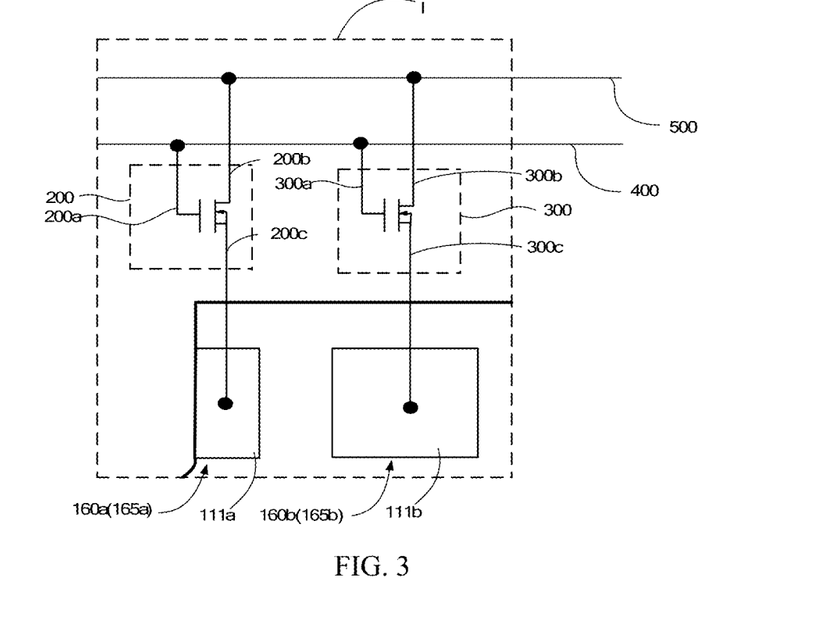
FIG. 3 is an enlarged schematic diagram at I of FIG. 2 according to some implementations.
Figure 4:
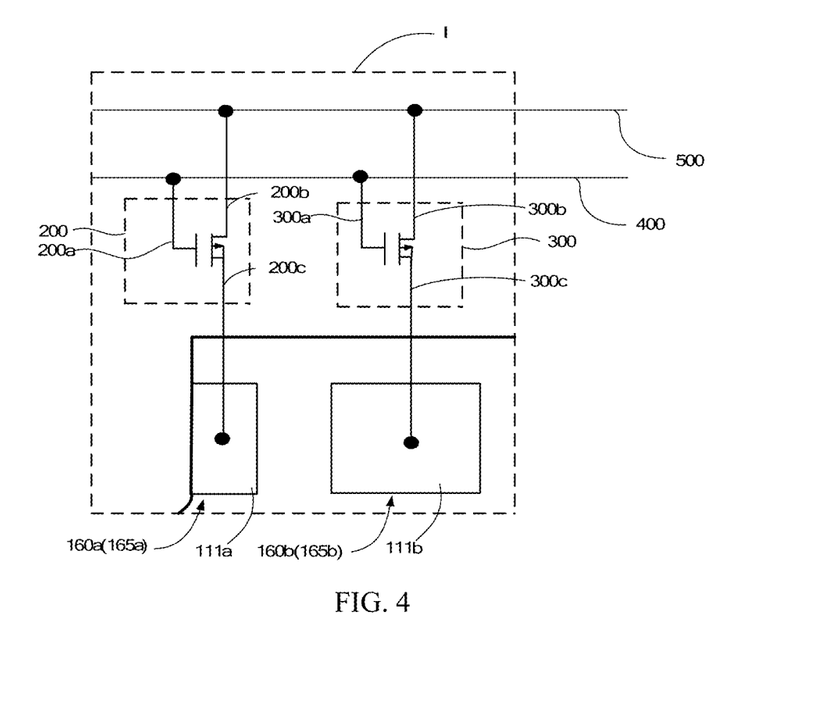
FIG. 4 is an enlarged schematic diagram at I of FIG. 2 according to other implementations.

Referring to FIG. 3 or FIG. 4, FIG. 3 is an enlarged schematic diagram at I of FIG. 2 according to some implementations, and FIG. 4 is an enlarged schematic diagram at I of FIG. 2 according to other implementations. In one implementation, the first switch 200 includes a first control end 200a, a first connection end 200b, and a second connection end 200c. The first control end 200a is electrically coupled with the first transmission line 400. The first connection end 200b is electrically coupled with the second transmission line 500. The second connection end 200c is electrically coupled with the first electrode 111a. In one implementation, the second switch 300 includes a second control end 300a, a third connection end 300b, and a fourth connection end 300c. The second control end 300a is electrically coupled with the first transmission line 400. The third connection end 300b is electrically coupled with the second transmission line 500. The fourth connection end 300c is electrically coupled with the second electrode 111b. The first transmission line 400 is configured to be loaded with a first control signal and the second transmission line 500 is configured to be loaded with a second control signal. When the touch display panel 100 is in the display mode, the first control signal is configured to control the first switch 200 and the second switch 300 to switch on. When the touch display panel 100 is in the touch mode, the first control signal is configured to control the first switch 200 and the second switch 300 to switch off. The second control signal is a common voltage signal.

In one implementation, the first switch 200 and the second switch 300 are both thin film transistors, the first control end 200a and the second control end 300a are gates of the thin film transistors, the first connection end 200b and the third connection end 300b are drains of the thin film transistors, and the second connection end 200c and the fourth connection end 300c are sources of the thin film transistors. Alternatively, in another implementation, the first switch 200 and the second switch 300 are both thin film transistors, the first control end 200a and the second control end 300a are gates of the thin film transistors, the first connection end 200b and the third connection end 300b are sources of the thin film transistors, and the second connection end 200c and the fourth connection end 300c are drains of the thin film transistors.

In one implementation described in conjunction with FIG. 3, the first switch 200 and the second switch 300 are N-type thin film transistors. FIG. 5 is a timing diagram of a first control signal and a second control signal in a touch display panel at respective stages, when a first switch and a second switch in the touch display panel are N-type thin film transistors. As illustrated in FIG. 5, when the touch display panel 100 is in the display mode, the first control signal is at high level and the second control signal is at low level; when the touch display panel 100 is in the touch mode, the first control signal is at low level and the second control signal is at low level. In this implementation, when the touch display module 10 is in the buffer time period, the first control signal is at low level and the second control signal is at low level.

In one implementation described in conjunction with FIG. 4, the first switch 200 and the second switch 300 are P-type thin film transistors. FIG. 6 is a timing diagram of a first control signal and a second control signal in a touch display panel at respective stages, when a first switch and a second switch in the touch display panel are P-type thin film transistors. As illustrated in FIG. 6, when the touch display panel 100 is in the display mode, the first control signal is at low level and the second control signal is at low level; when the touch display panel 100 is in the touch mode, the first control signal is at high level and the second control signal is at low level. In this implementation, when the touch display module 10 is in the buffer time period, the first control signal is at high level and the second control signal is at low level.

Figure 7:
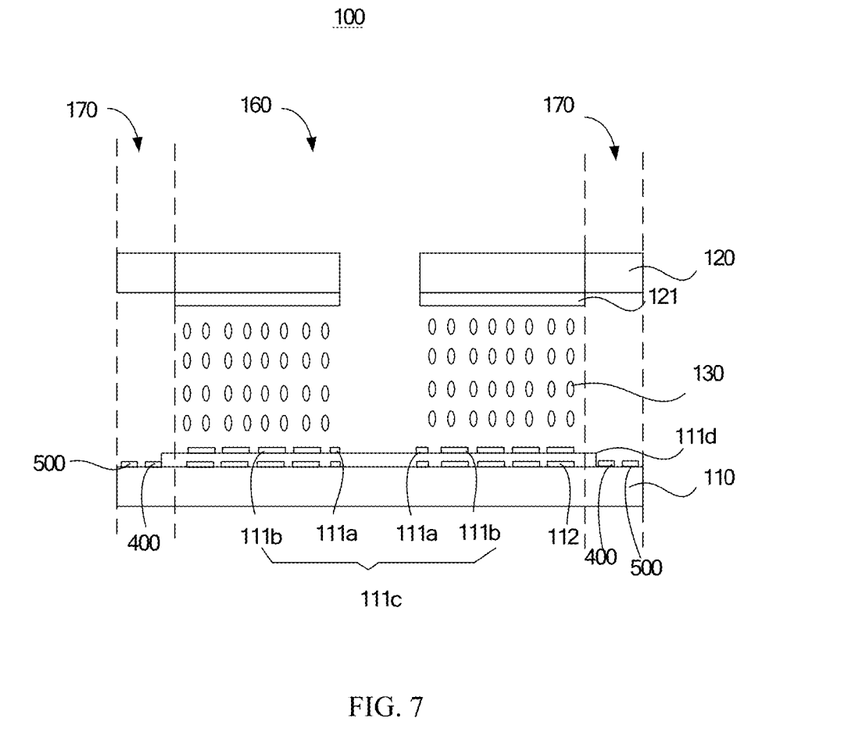
FIG. 7 is a schematic structural diagram taken along line II-II of FIG. 1.

FIG. 7 is a schematic structural diagram taken along line II-II of FIG. 1. In one implementation, as illustrated in FIG. 7, the touch display panel 100 includes a first substrate 110. The first substrate 110 is provided with common electrodes 111c. The common electrodes include a plurality of first electrodes 111a which are spaced apart from one another and a plurality of second electrodes 111b which are spaced apart from one another. The first substrate 110 is further provided with a pixel electrode(s) 112. The pixel electrode 112 is insulated from the common electrode 111c. As illustrated in FIG. 7, an insulating layer 111d is disposed between the pixel electrode 112 and the common electrode 111c. The insulating layer 111d is used to insulate the pixel electrode 112 and the common electrode 111c. The touch display panel 100 further includes a second substrate 120 and a liquid crystal layer 130. The second substrate 120 is spaced apart from the first substrate 110. The second substrate 120 is provided with a light-filtering unit 121. The liquid crystal layer 130 is disposed between the first substrate 110 and the second substrate 120. The light-filtering unit 121 is configured to allow lights of a preset color to pass through. The first substrate 110 is a thin-film transistor array substrate of the touch display panel 100, and the second substrate 120 is a color film substrate of the touch display panel 100. When the touch display panel 100 is in the display mode, the pixel electrode 112 is loaded with a pixel voltage, and the common electrode is loaded with a common voltage. The pixel voltage and the common voltage cooperate with each other to achieve flipping of liquid crystal molecules in the liquid crystal layer 130 (i.e., flipping by a specific angle).

In this implementation, the touch display panel 100 includes a display area 160 which is transparent and a non-display area 170 which is non-transparent (see FIG. 1 to FIG. 7). The first switch 200, the second switch 300, the first transmission line 400, and the second transmission line 500 are all disposed in the non-display area 170. Positions of the first switch 200, the second switch 300, the first transmission line 400, and the second transmission line 500 in the non-display area 170 are illustrated. In one implementation, the first switch 200, the second switch 300, the first transmission line 400, and the second transmission line 500 are disposed on the array substrate (i.e., the first substrate), the first transmission line 400 and the second transmission line 500 are disposed in the non-display area 170, and the first transmission line 400 and the second transmission line 500 are spaced apart from one another and disposed on the array substrate.

Figure 8:
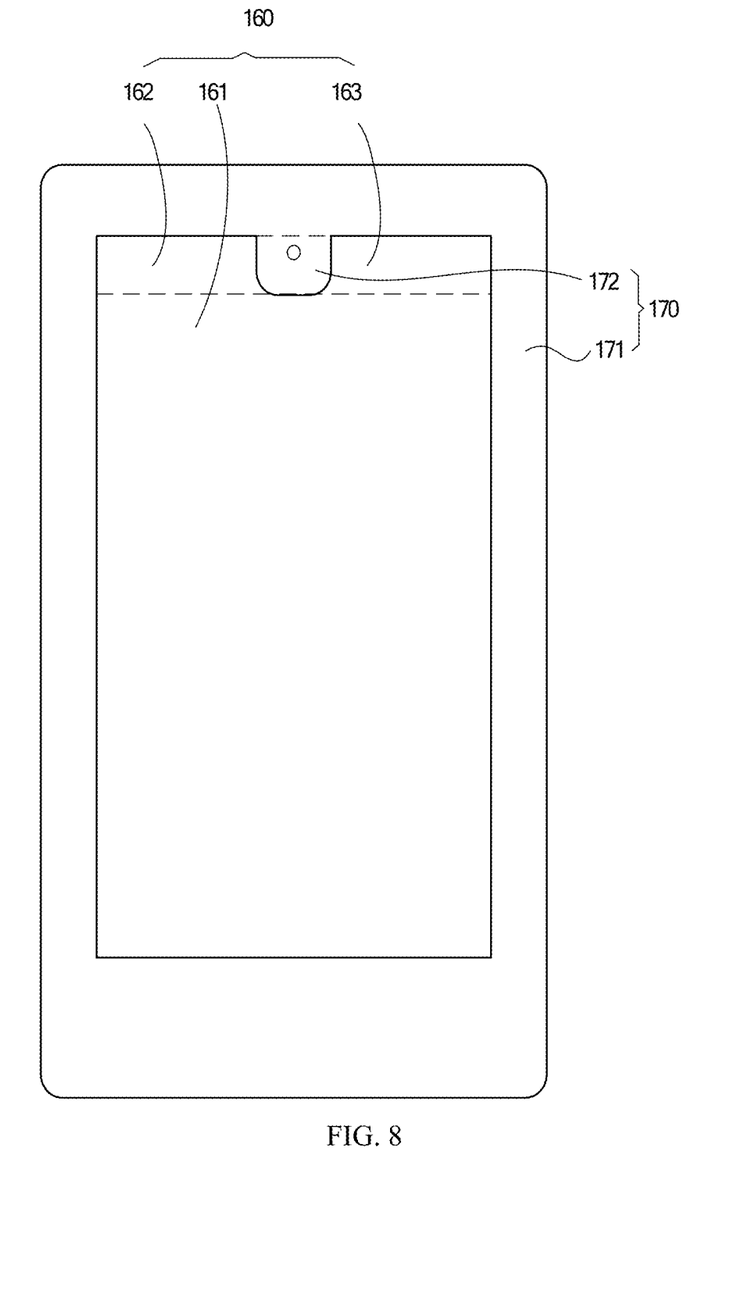
FIG. 8 is a schematic structural diagram illustrating a display area and a non-display body area in the touch display module according to a first implementation.

FIG. 8 is a schematic structural diagram illustrating a display area and a non-display body area in the touch display module according to a first implementation. As illustrated in FIG. 8, the touch display panel 100 further includes a display area 160 disposed adjacent to a non-display area 170. The display area 160 includes a display body area 161 (i.e., a main display area), a first display extension area 162, and a second display extension area 163. The first display extension area 162 and the second display extension area 163 are extended from a same side of the display body area 161. The first display extension area 162 is spaced apart from the second display extension area 163. The non-display area 170 includes a non-display body area 171 (i.e., a main non-display area) and a non-display extension area 172 which is extended from the non-display body area 171 towards the display area 160. The non-display extension area 172 is sandwiched between the first display extension area 162 and the second display extension area 163. In this implementation, the non-display extension area 172 is U-shaped.

The first pixel area 160a is located in the display area 160 adjacent to the non-display area 170. The first pixel area 160a has an area smaller than the second pixel area 160b.

Figure 9:
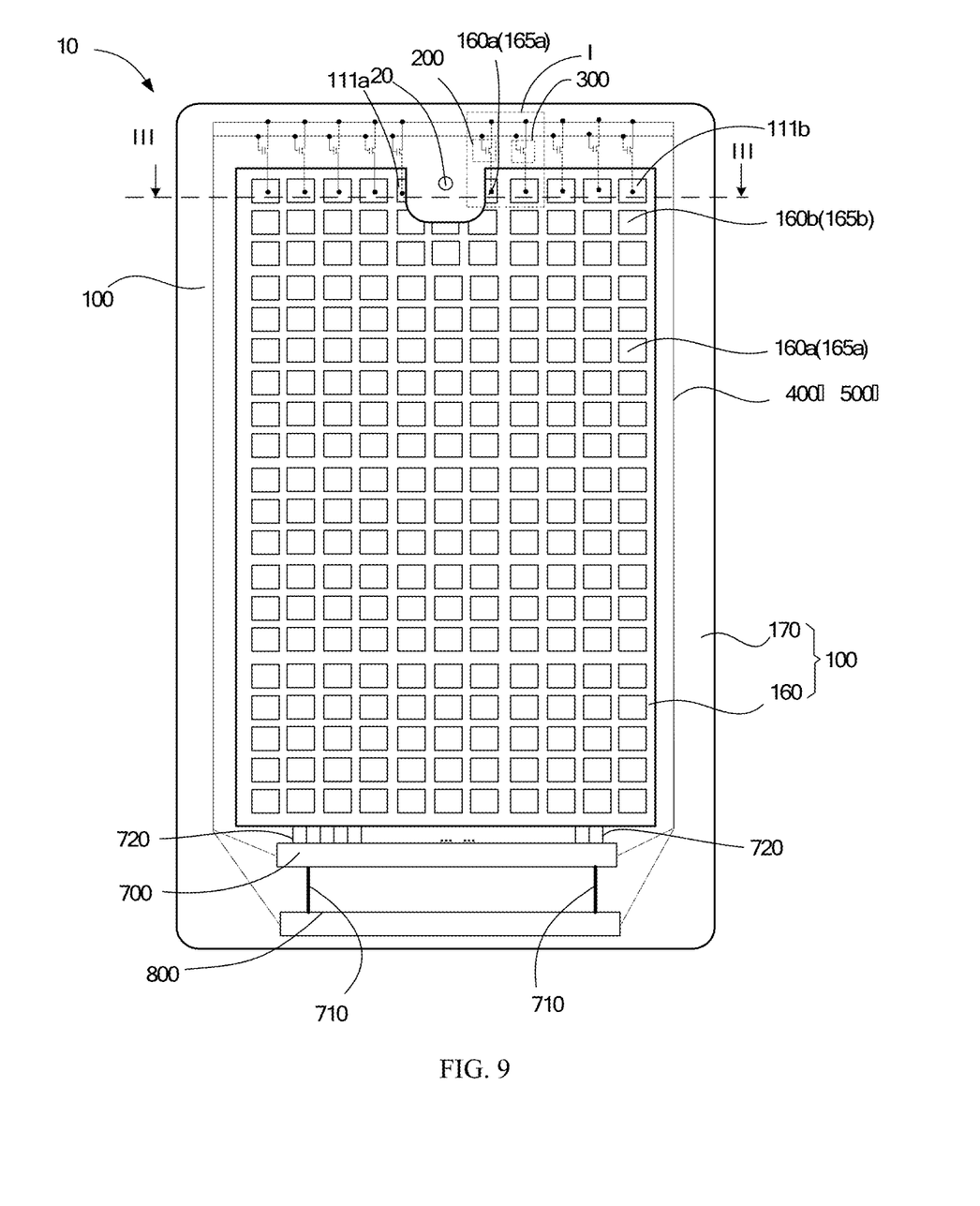
FIG. 9 is a schematic structural diagram illustrating a touch display module according to a second implementation.
Figure 10:
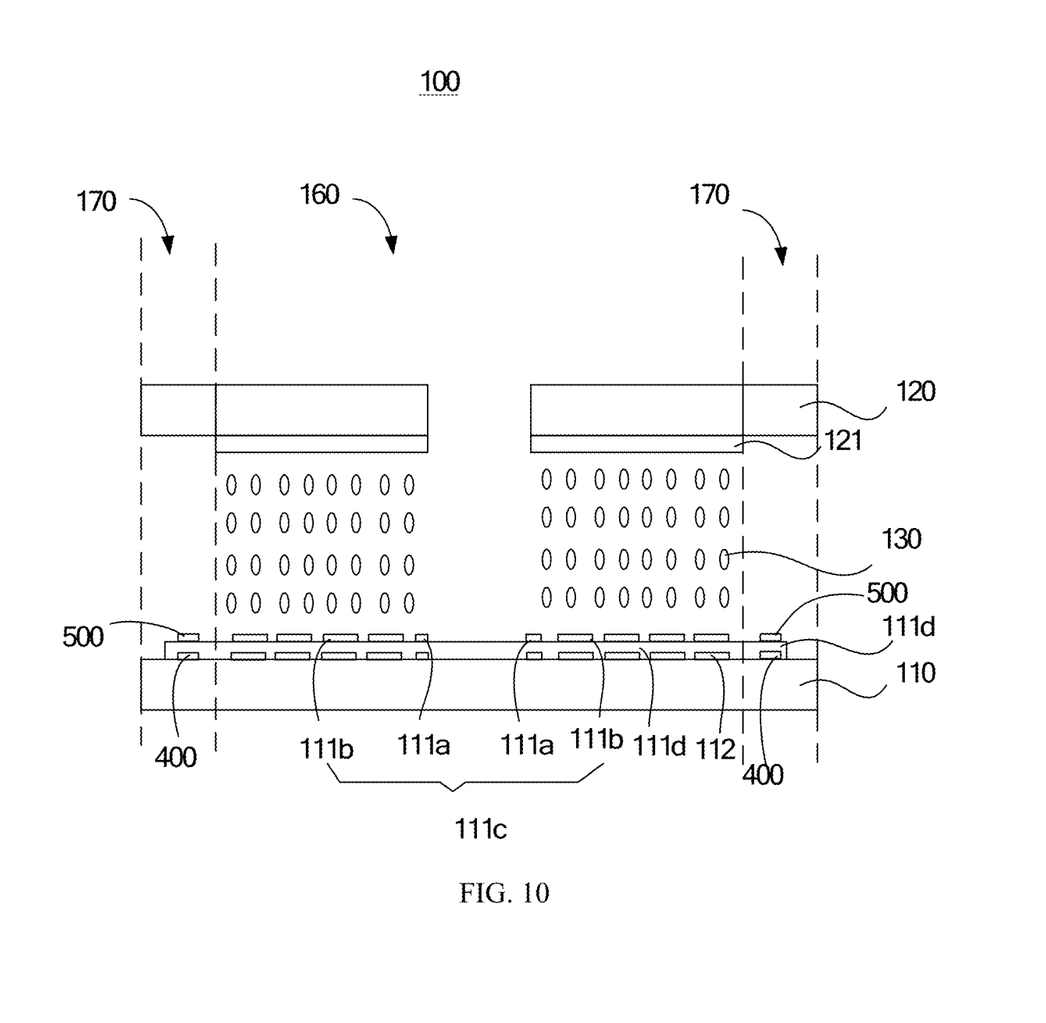
FIG. 10 is a cross sectional structural diagram taken along line III-III of FIG. 9.

Referring to FIG. 9 and FIG. 10, FIG. 9 is a schematic structural diagram illustrating a touch display module according to a second implementation, and FIG. 10 is a cross sectional structural diagram taken along line III-III of FIG. 9. The touch display module 10 of the second implementation is basically the same in structure as the touch display module 10 of the first implementation, except that in the second implementation, the first transmission line 400 and the second transmission line 500 are at least partially stacked and an insulating layer 600 is provided between the first transmission line 400 and the second transmission line 500. Since the first transmission line 400 and the second transmission line 500 are disposed in the non-display area 170, in this implementation, the first transmission line 400 and the second transmission line 500 are at least partially stacked, which can reduce a width of the non-display area 170, thereby facilitating realization of a narrow border. In this implementation, the insulating layer 111d and the insulating layer 600 are designed to form an integral insulating layer.

Referring to FIG. 2 and FIG. 9, the touch display module 10 further includes a driving chip 700 and a flexible circuit board 800. The driving chip 700 is configured to generate a first control signal and a second control signal. The driving chip 700 includes a dummy pin(s) 710 and a touch signal pin(s) 720. The dummy pin 710 is electrically coupled with the flexible circuit board 800 and electrically coupled with the second transmission line 500 via the flexible circuit board 800, to transmit the second control signal to the second transmission line 500. The touch signal pin 720 is configured to output a driving signal to the first electrodes 111a and the second electrodes 111b and transmit a detection signal detected to the driving chip 700 when the touch display module 10 is in the touch mode. When the touch display module 10 is in the touch mode, each first electrode 111a and each second electrode 111b are independent of each other. The detection signal detected is used to detect whether the touch display panel 100 receives a touch operation instruction and to detect a position of the touch operation instruction.

With reference to the foregoing touch display module 10, another touch display module 10 is further provided. The touch display module 10 includes a touch display panel 100. The touch display panel 100 includes a first pixel area 160a and a second pixel area 160b. The first pixel area 160a includes a first pixel(s) 165a. An RC load of the first pixel 165a is a first load. The second pixel area 160b includes a second pixel(s) 165b. An RC load of the second pixel 165b is a second load. The first load is not equal to the second load. The touch display panel 100 is operable with a display mode. When the touch display module 10 is in the display mode, the first pixel area 160a and the second pixel area 160b are loaded with a same driving current, so that brightness of the first pixel area 160a is the same as that of the second pixel area 160b.

The touch display panel 100 is further operable with a touch mode. When the touch display panel 100 is in the touch mode, the touch display panel 100 is configured to detect a touch signal on the touch display panel 100. A time period during which the touch display panel 100 displays a frame of an image includes a first time period and a second time period that are consecutive in sequence. The touch display panel 100 is in the display mode during the first time period. The touch display panel 100 is in the touch mode during the second time period.

The time period during which the touch display panel 100 displays a frame of an image further includes a buffer time period before the first time period. When the touch display panel 100 is in the buffer time period, the touch display panel 100 is configured to release remained power for displaying a previous frame of an image.

Figure 11:
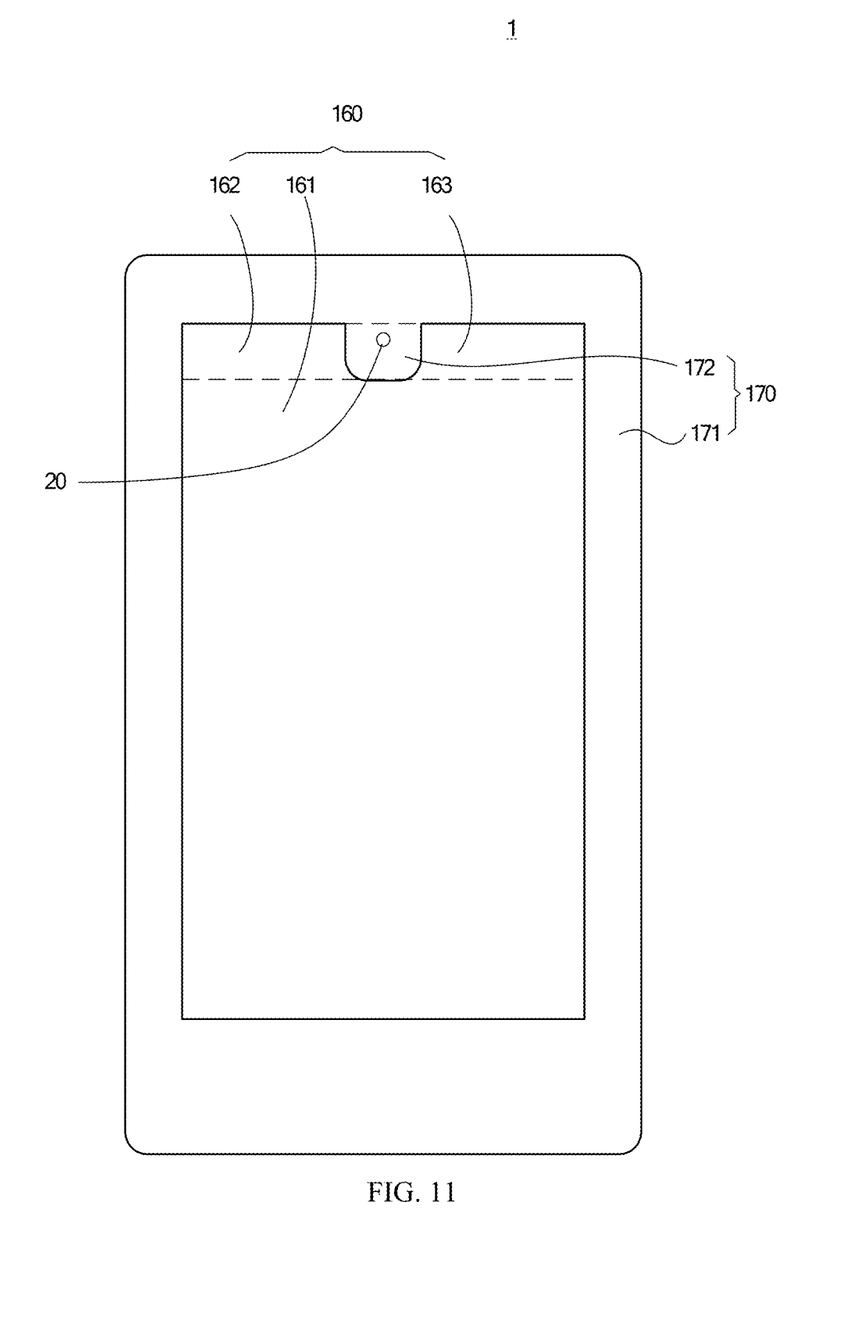
FIG. 11 is a schematic structural diagram illustrating an electronic device according to a second implementation.

Hereinafter, an electronic device 1 of the disclosure will be described with reference to the foregoing touch display module 10. FIG. 11 is a schematic structural diagram illustrating an electronic device according to a second implementation. An electronic device 1 is further provided. As illustrated in FIG. 11, the electronic device 1 includes a touch display module 10 and a functional component 20. For details, reference may be made to the related descriptions in the foregoing touch display module 10, and it will not be described in further detail herein. The functional component 20 may be, but not limited to, a proximity sensor, a front camera, or the like. The touch display panel 100 further includes a display area 160 disposed adjacent to a non-display area 170. The display area 160 includes a display body area 161, a first display extension area 162, and a second display extension area 163. The first display extension area 162 and the second display extension area 163 are extended from a same side of the display body area 161. The first display extension area 162 is spaced apart from the second display extension area 163. The non-display area 170 includes a non-display body area 171 and a non-display extension area 172 which is extended from the non-display body area 171 towards the display area 160. The non-display extension area 172 is sandwiched between the first display extension area 162 and the second display extension area 163. In one implementation, the functional component 20 is disposed in the non-display extension area 172. In another implementation, the functional component 20 is disposed in the non-display extension area 172 and an area where the non-display body area 171 is connected to the non-display extension area 172.

While the implementations of the disclosure have been described, it will be understood by those skilled in the art that various improvements and variants may be made without departing from the principles of the implementations of the disclosure. These improvements and variants shall all be encompassed within the protection of the disclosure.

What is claimed is:

1. A touch display module comprising:
 a touch display panel, wherein:
  the touch display panel is provided with a first pixel area comprising a first pixel and a second pixel area comprising a second pixel, wherein a resistor-capacitance (RC) load of the first pixel is not equal to an RC load of the second pixel;
  the first pixel area is provided with a first electrode corresponding to the first pixel, the second pixel area is provided with a second electrode corresponding to the second pixel, wherein the first electrode is spaced apart from the second electrode;
  the first electrode is electrically coupled with the second electrode via a first switch, a second switch, a first transmission line, and a second transmission line of the touch display module when the touch display panel is operating in a display mode, wherein the first electrode and the second electrode are common electrodes; and
  the first electrode is electrically insulated from the second electrode when the touch display panel is operating in a touch mode.

2. The touch display module of claim 1, wherein the first switch comprises a first control end, a first connection end, and a second connection end, the first control end is electrically coupled with the first transmission line, the first connection end is electrically coupled with the second transmission line, and the second connection end is electrically coupled with the first electrode; the second switch comprises a second control end, a third connection end, and a fourth connection end, the second control end is electrically coupled with the first transmission line, the third connection end is electrically coupled with the second transmission line, and the fourth connection end is electrically coupled with the second electrode; the first transmission line is configured to be loaded with a first control signal suitable for controlling the first switch and the second switch to switch on when the touch display panel is operating in the display mode, the second transmission line is configured to be loaded with a second control signal, wherein the second control signal is a common voltage signal.

3. The touch display module of claim 2, wherein the first control signal is suitable for controlling the first switch and the second switch to switch off when the touch display panel is operating in the touch mode.

4. The touch display module of claim 1, wherein the touch display panel comprises a first substrate, and the first substrate is provided with common electrodes, the common electrodes comprise a plurality of first electrodes spaced apart from one another and a plurality of second electrodes spaced apart from one another.

5. The touch display module of claim 4, wherein the first substrate is further provided with pixel electrodes, and the pixel electrodes are insulated from the common electrodes.

6. The touch display module of claim 4, wherein the touch display panel further comprises a second substrate and a liquid crystal layer, the second substrate is spaced apart from the first substrate, the second substrate is provided with a light-filtering unit, and the liquid crystal layer is disposed between the first substrate and the second substrate.

7. The touch display module of claim 1, wherein the touch display panel comprises a non-display area which is non-transparent, and the first switch, the second switch, the first transmission line, and the second transmission line are all disposed in the non-display area.

8. The touch display module of claim 7, wherein the first transmission line and the second transmission line are at least partially stacked, and an insulating layer is provided between the first transmission line and the second transmission line.

9. The touch display module of claim 7, wherein the touch display panel further comprises a display area, the display are is disposed adjacent to the non-display area and comprises a display body area, a first display extension area, and a second display extension area, the first display extension area and the second display extension area are extended from a same side of the display body area, and the first display extension area is spaced apart from the second display extension area; the non-display area comprises a non-display body area and a non-display extension area which is extended from the non-display body area towards the display area, and the non-display extension area is sandwiched between the first display extension area and the second display extension area.

10. The touch display module of claim 9, wherein the first pixel area is located in the display area adjacent to the non-display area, and an area of the first pixel area is smaller than an area of the second pixel area.

11. The touch display module of claim 1, wherein a time period for the touch display panel to display a frame of an image comprises a first time period and a second time period successively, the touch display panel is operating in the display mode during the first time period, and the touch display panel is operating in the touch mode during the second time period.

12. The touch display module of claim 11, wherein the time period for the touch display panel to display a frame of an image further comprises a buffer time period before the first time period, and when the display panel is in the buffer time period, the touch display panel is configured to release remained power for displaying a previous frame of an image.

13. The touch display module of claim 2, wherein the touch display module further comprises a driving chip and a flexible circuit board, the driving chip is configured to generate the second control signal, the driving chip comprises a dummy pin, the dummy pin is electrically coupled with the flexible circuit board and electrically coupled with the second transmission line via the flexible circuit board to transmit the second control signal to the second transmission line.

14. An electronic device, comprising:
a touch display module comprising a touch display panel, wherein:
the touch display panel is provided with a first pixel area comprising a first pixel and a second pixel area comprising a second pixel, wherein a resistor-capacitance (RC) load of the first pixel is not equal to an RC load of the second pixel;
the first pixel area is provided with a first electrode corresponding to the first pixel, the second pixel area is provided with a second electrode corresponding to the second pixel, wherein the first electrode is spaced apart from the second electrode;
the first electrode is electrically coupled with the second electrode via a first switch, a second switch, a first transmission line, and a second transmission line of the touch display module when the touch display panel is operating in a display mode, wherein the first electrode and the second electrode are common electrodes; and
the first electrode is electrically insulated from the second electrode when the touch display panel is operating in a touch mode.

15. The electronic device of claim 14, wherein the first switch comprises a first control end, a first connection end, and a second connection end, the first control end is electrically coupled with the first transmission line, the first connection end is electrically coupled with the second transmission line, and the second connection end is electrically coupled with the first electrode; the second switch comprises a second control end, a third connection end, and a fourth connection end, the second control end is electrically coupled with the first transmission line, the third connection end is electrically coupled with the second transmission line, and the fourth connection end is electrically coupled with the second electrode; the first transmission line is configured to be loaded with a first control signal suitable for controlling the first switch and the second switch to switch on when the touch display panel is operating in the display mode, the second transmission line is configured to be loaded with a second control signal, wherein the second control signal is a common voltage signal.

16. The electronic device of claim 15, wherein the first control signal is suitable for controlling the first switch and the second switch to switch off when the touch display panel is operating in the touch mode.

17. The electronic device of claim 14, wherein the touch display panel comprises a first substrate, and the first substrate is provided with common electrodes, the common electrodes comprise a plurality of first electrodes spaced apart from one another and a plurality of second electrodes spaced apart from one another.

18. The electronic device of claim 14, wherein the touch display panel comprises a non-display area which is non-transparent, and the first switch, the second switch, the first transmission line, and the second transmission line are all disposed in the non-display area.

19. The electronic device of claim 14, wherein a time period for the touch display panel to display a frame of an image comprises a first time period and a second time period successively, the touch display panel is operating in the display mode during the first time period, and the touch display panel is operating in the touch mode during the second time period.

20. The electronic device of claim 19, wherein the time period for the touch display panel to display a frame of an image further comprises a buffer time period before the first time period, and when the display panel is in the buffer time period, the touch display panel is configured to release remained power for displaying a previous frame of an image.

* * * * *